United States Patent [19]

Kukkula

[11] 4,388,943
[45] Jun. 21, 1983

[54] LINKAGE FOR MOMENT BALANCING MEASURING APPARATUS

[75] Inventor: Juhani Kukkula, Tampere, Finland
[73] Assignee: Valmet Oy, Finland
[21] Appl. No.: 261,242
[22] Filed: May 6, 1981

[30] Foreign Application Priority Data

May 21, 1980 [FI] Finland ............................... 801651

[51] Int. Cl.³ .......................................... G05D 16/00
[52] U.S. Cl. .................................. 137/85; 73/432 A; 74/522
[58] Field of Search .................. 74/469, 519, 522; 137/557, 85, 86; 73/432 A

[56] References Cited

U.S. PATENT DOCUMENTS

| | | | |
|---|---|---|---|
| 2,776,669 | 1/1957 | Gorrie | 137/86 |
| 2,789,543 | 4/1957 | Popowsky | 137/85 X |
| 2,907,338 | 10/1959 | Watrous | 137/85 |
| 3,080,853 | 3/1963 | Puster | 137/85 |
| 3,279,490 | 10/1966 | Nishihara | 137/85 |
| 3,739,655 | 6/1973 | Boden | 74/469 |
| 3,742,969 | 7/1973 | Siegel | 137/85 |

*Primary Examiner*—Joseph W. Hartary
*Attorney, Agent, or Firm*—Steinberg & Raskin

[57] ABSTRACT

A linkage for use in moment balancing measuring apparatus of the pneumatic type includes first and second pivotally mounted levers, the second lever being adapted to be acted upon by a measuring force and the first lever being adapted to be acted upon by a pneumatic force for balancing the linkage. According to the invention, apparatus are provided for adjustably varying the leverage ratio of the linkage, i.e., the ratio of the pneumatic force to the measuring force according to the particular application to which the linkage is put. The leverage ratio adjusting apparatus includes a rod-like member having one end rotatably attached to one of the levers and first locking means for selectively securing the rod-like member in a particular position corresponding to the particular application to which the linkage is put.

9 Claims, 2 Drawing Figures

LINKAGE FOR MOMENT BALANCING MEASURING APPARATUS

BACKGROUND OF THE INVENTION

This invention relates generally to moment balancing mechanisms and, more particularly, to a linkage for use in moment balancing measuring apparatus of the pneumatic type including a linkage comprising first and second levers, the linkage being adapted to be acted upon by a measuring force derived from a measuring element and wherein the linkage is balanced by a pneumatic force applied thereto.

Pneumatic moment balancing apparatus are known wherein a measured value in the form of a force is converted to a corresponding air pressure for transmission of the measured value over a distance.

More particularly, in conventional pneumatic balancing apparatus, the measuring force $f_m$ generated by a measuring element acts on a beam mounted for rotation in a plane with respect to a pivot point. The beam is maintained in a balanced condition by a pneumatic force $f_p$ which results from air pressure acting within a corrugated or bellows type tube. Compressed air is conducted into a pneumatic system through a throttle and a flap which is affixed to the balance beam and regulates the air flow discharging through a nozzle in accordance with the position of the beam thereby resulting in a particular pressure arising within the pneumatic system.

The pneumatic system of such conventional moment balancing apparatus is designed such that only a minimal movement of the flap, e.g., about 0.1 mm, will cause the air pressure within the pneumatic system to vary through the entire standardized signal range, e.g., 0.2 to 1.0 bar.

Therefore, as the measuring force $f_m$ varies, the air pressure within the pneumatic system varies accordingly and the leverage ratio, $f_p/f_m$ is automatically maintained constant.

The pneumatic system is provided with an output connector from which air pressure proportional to the measuring force may be transmitted into a conduit through which the same is transmitted so as to constitute a measuring signal at a remote location.

It is desirable to provide such moment balancing apparatus with a capability such that the ratio $f_p/f_m$ can be varied in order to adapt the apparatus to the particular range of variation of the measuring force $f_m$ for any particular instance of measurement. It is advantageous to provide a relatively wide range of variability for the leverage ratio $f_p/f_m$ so that the size of the measuring elements, e.g., the diaphragm or corrugated tube elements which convert a pressure to a measuring force, can be maintained relatively small. Thus, attempts have been made to provide linkages wherein the maximum lever ratio $f_p/f_m$ is about 10 to 15 times its smallest usable value. The variation of the lever ratio $f_p/f_m$ has been accomplished in prior art apparatus through appropriate movement of the fulcrum point of the balance beam.

The arrangement described above for varying the lever ratio is not entirely satisfactory for several reasons. Firstly, it is difficult using such an arrangement to achieve a relatively wide range of variation for the lever ratio $f_p/f_m$. Secondly, only a single definite position of the fulcrum will result in the beam being in a precise balanced position. In other words, when the beam fulcrum is displaced in order to vary the ratio $f_p/f_m$, an imbalance occurs which results in the apparatus becoming particularly sensitive to vibrations. Thirdly, the displacement of the fulcrum of the balance beam is an awkward operation since the fulcrum must be dismounted and then remounted at both of its ends and, further, during displacement care must be taken to move both ends through the same distance.

Another type of apparatus wherein the lever ratio $f_p/f_m$ can be varied has a so-called double lever design. The balancing of a device of this type is hampered, however, by the movable lever connecting piece. Additionally, the displacement thereof is a relatively cumbersome operation.

Yet another prior art linkage construction is known wherein the particular leverage ratio $f_p/f_m$ is set by adjusting the angle $\alpha$ between two levers. Although the linkage remains balanced in this apparatus, it is difficult in practice to obtain the desired adjustment range for the leverage ratio for the reason that with small angles $\alpha$ the temperature of the apparatus exerts an increased influence on the measuring signal so that the setting of the leverage ratio $f_p/f_m$ accordingly becomes difficult since the sensitivity to small changes in such adjustment is quite high. Reference is made to U.S. Pat. No. 3,739,655 in which apparatus of the type described above is disclosed.

SUMMARY OF THE INVENTION

Accordingly, one object of the present invention is to provide a new and improved linkage for use in moment balancing measuring apparatus.

Another object of the present invention is to provide a new and improved linkage for use in moment balancing measuring apparatus wherein the leverage ratio is variable in a simple manner.

Still another object of the present invention is to provide a new and improved moment balancing measuring apparatus which can be balanced in a reliable manner.

A further object of the present invention is to provide a new and improved moment balancing measuring apparatus wherein the leverage ratio is adjustable over an entire range of adjustment in a uniform manner.

A still further object of the present invention is to provide a new and improved linkage for use in a moment balancing measuring apparatus wherein the leverage ratio is adjustable over a relatively wide adjustment range.

Yet another object of the present invention is to provide a linkage for use in moment balancing measuring apparatus wherein adjustment of the leverage ratio is accomplished in a reliable and accurate manner.

According to the present invention, these and other objects are attained by providing a linkage for use in moment balancing measuring apparatus and which includes apparatus for adjustably varying the leverage ratio, i.e., the ratio of the pneumatic force to the measuring force. More particularly, the leverage ratio adjusting apparatus comprises a rod-like member which is rotatably and integrally attached to the linkage and locking apparatus for securing the rod-like member in a particular adjustment position corresponding to a respective particular instance of measurement.

According to the disclosed embodiments, the apparatus includes first and second pivotally mounted levers wherein the pneumatic force is applied to the first lever through a bellows-type tube. The pneumatic force is determined by the proximity of a flap mounted on the second lever to a fixed nozzle forming part of the pneumatic system. The apparatus for adjustably varying the leverage ratio includes a rod-like member having one end rotatably attached to the first lever and locking means for selectively securing the rod-like member in a particular position with respect to the second lever corresponding to a particular instance of measurement. In the illustrated embodiments, the locking means comprise a curved groove formed in the second lever.

In one embodiment, the second lever includes a substantially circular arcuate portion having a center of curvature which is substantially coincident with the point at which the rod-like member is attached to the first lever. In another embodiment, the second lever includes a portion which is movably disposed, the rod-like member being disposed within the movably disposed portion of the second lever.

DESCRIPTION OF THE DRAWINGS

A more complete appreciation of the present invention and many of the attendant advantages thereof will be readily appreciated as the same becomes better understood by reference to the following detailed description when considered in connection with the accompanying drawings in which.

DETAILED DESCRIPTION OF THE PREFERRED EMBODIMENTS

Figure 1:
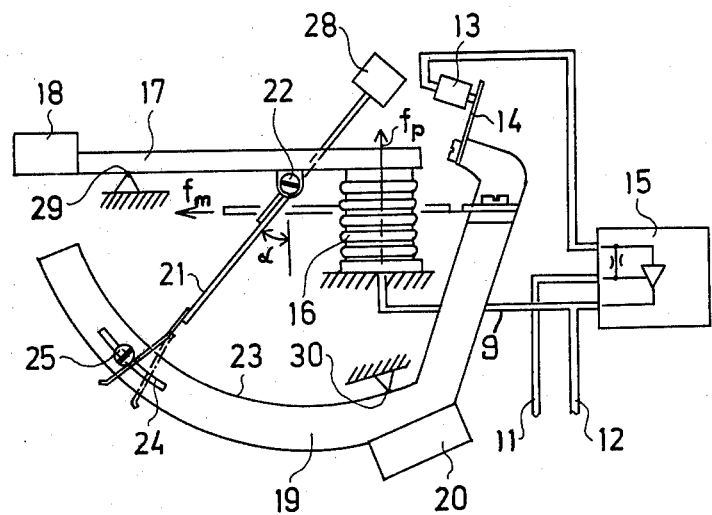
FIG. 1 is a schematic elevational view of one embodiment of the linkage of the present invention, a pneumatic system for use therewith also being illustrated.

Referring now to the drawings wherein like reference characters designate identical or corresponding parts throughout the several views, and more particularly to FIG. 1, a linkage according to the present invention includes first lever 17 journalled on fulcrum 29 and second lever 19 journalled on fulcrum 30, the levers being balanced about their fulcrums by first and second counterweights 18 and 20, respectively.

A pneumatic system is associated with the linkage for converting the measuring force to a corresponding pressure value for transmission to a remote location. The pneumatic system includes a duct 11 adapted to be connected to a source of pressurized gas (not shown) and a fixed nozzle 13 in fluid communication with one end of the first duct 11.

A second duct 9 fluidly intercommunicates at one end with the first duct 11 through a pressure amplifier 15 and at its other end with a bellows-type, e.g., corrugated, tube 16, one end of which is fixed to the frame of the apparatus and the other end of which is affixed to first lever 17. A third output duct 12 fluidly communicates with the second duct 9, the output signal from the arrangement being transmitted through duct 12.

A flap member 14 is fixedly mounted to one end of the second lever 19 and is positioned such that it is contiguous with the fixed nozzle 13.

In operation, the first duct 11 is connected to a compressed air source and a measuring force applied to the system through second lever 19. The position of flap 14 relative to the fixed nozzle 13 is determined by the position of the linkage 17, 19. The particular pressure which builds up in the nozzle 13 as a result of the positioning of flap 14 acts on the pressure amplifier 15 whereby a pressure proportional to the nozzle pressure is generated within the second duct 9 and bellows tube 16 thereby giving rise to the application of a pneumatic force $f_p$ on first lever 17 which balances the linkage 17 and 19.

It is understood that the pressure amplifier 15 may be replaced by an injector throttle or may be altogether eliminated in which case the nozzle pressure is transmitted directly to the bellows tube 16.

According to the invention, apparatus is provided for varying the leverage ratio $f_p/f_m$ to obtain a ratio most suitable for the particular instance of measurement. More particularly, a connecting rod 21 is rotatably mounted in a selectively fixable manner to first lever 17 at an attachment point 22 in a manner so as to be rotatable in the same plane as the linkage 17 and 19. The lever 19 is formed so as to include a substantially circular arc-shaped portion 23 located such that its center of rotation is substantially coincident with the point of attachment 22 of connecting rod 21 which of course constitutes the axis of rotation thereof.

As seen in FIG. 1, the connecting rod 21, which is balanced by means of counterweight 28, has at its end opposite to attachment point 22 an angled extension which, upon rotatable adjustment of the connecting rod 21, will travel along the arc-shaped portion 23 of second lever 19.

Locking apparatus are provided on second lever 19 for securing the connecting rod 21 at its particular desired position. The locking apparatus includes an arcuate groove 24 formed in the arc-shaped portion 23 of lever 19 and a locking bolt 25 adapted to be fixed in groove 24 at any selected position therewithin.

The leverage ratio $f_p/f_m$ most suited for the particular application of measurement, e.g., the particular magnitude of the measuring force $f_m$, is obtained through rotation of the connecting rod 21 with respect to the attachment point 22 and fixing the position of the end of the connecting rod 21 with respect to the arc-shaped portion 23 of second lever 19. Thus, as the angle $\alpha$ indicated in FIG. 1 changes from one value to another, the ratio $f_p/f_m$ changes proportionally by a particular multiplying factor.

Figure 2:
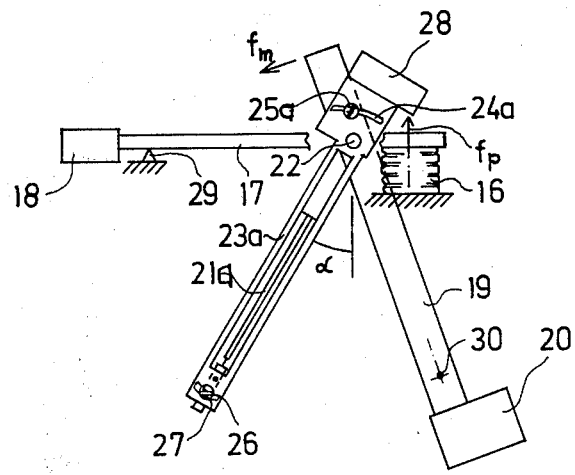
FIG. 2 is a schematic elevational view of another embodiment of a linkage according to the present invention.

Referring now to FIG. 2 wherein an additional embodiment of a linkage according to the present invention is illustrated, the ducts and amplifier of the pneumatic system are not shown for purposes of clarity and are understood to comprise essentially the same system as illustrated in connection with the embodiment of FIG. 1. The same reference numerals are used in FIG. 2 to designate equivalent elements of the embodiment in FIG. 1. Thus, the linkage is substantially the same as that of FIG. 1 with the exception that the second lever 19, journalled about fulcrum 30 has a different configuration including a movable portion 23a in which the connecting rod 21a is situated. An arcuate groove 24a is formed in the movably disposed portion 23a of second lever 19 and a locking bolt 25a is fixedly disposed within the groove. Coarse adjustment of the leverage ratio of the linkage is accomplished by securing the movable portion 23a of lever 19 to the curved groove 24a in a desired position by the locking bolt 25a. A fine adjustment of the leverage ratio is accomplished by securing an extension of the connecting rod 21a to a curved groove 26 and lever 19 by a locking bolt 27.

It is understood that the apparatus for adjusting the leverage ratio in the embodiment of FIG. 1 can also comprise course and fine adjustment, such for example as one similar to that illustrated in the embodiment of FIG. 2.

The linkage of the present invention provides several significant advantages relative to prior art apparatus. More particularly, the leverage ratio of the linkage may be changed in an easy and convenient manner. The linkage can be reliably balanced. Further, adjustment of the leverage ratio can be accomplished in a uniform manner over the entire range of adjustment. Still further, the range of adjustment of the linkage ratio is relatively wide, e.g., a range varying over a factor of 10. The particular leverage ratio desired can be accurately obtained and the locking of the connecting rod is similarly accurately obtainable.

Obviously, numerous modifications and variations of the present invention are possible in the light of the above teachings. It is therefore to be understood that within the scope of the claims appended hereto, the invention may be practiced otherwise than as specifically disclosed herein.

What is claimed is:

1. In a linkage for use in moment balancing measuring apparatus of the pneumatic type including first and second pivotally mounted levers, the linkage being adapted to be acted upon by a measuring force and a pneumatic force for balancing the linkage, the improvement comprising means for adjustably varying the leverage ratio of the linkage, i.e., the ratio of the pneumatic force to the measuring force, including a rod-like member having one end rotatably attached to said first lever of the linkage at an attachment point and first locking means for selectively securing said rod-like member to said second lever of the linkage in a particular position corresponding to a respective particular instance of measurement.

2. The combination of claim 1 wherein said second lever includes a substantially circular arcuate portion having a center of curvature which is substantially coincident with said point of attachment of said rod-like member to said first lever and wherein said rod-like member has another end located such that upon rotation of said rod-like member about said point of attachment, said another end moves along said circular arcuate portion of said second lever.

3. The combination of claim 2 wherein said circular arcuate portion of said second lever has curved groove means formed therein to which said rod-like member is securable by said first locking means in a particular position corresponding to a respective particular application.

4. The combination of claim 1 wherein said second lever includes a portion which is movably disposed with respect thereto, said rod-like member being disposed within said movably disposed portion.

5. The combination of claim 4 wherein said movably disposed portion of said second lever has first curved groove means formed therein to which said rod-like member is securable by said first locking means in a particular position corresponding to a respective particular application.

6. The combination of claim 5 wherein said means for adjustably varying the leverage ratio further includes means for effecting a coarse adjustment and separate means for effecting a fine adjustment.

7. The combination of claim 6 wherein said fine adjustment means includes second curved groove means formed in said movably disposed portion of said second lever and a body member connected to said rod-like member adapted to be secured to said second groove means, and second locking means for selectively securing said body member to said second groove means in a particular position corresponding to a respective particular application.

8. The combination of claim 1 wherein said first and second levers and said rod-like member each have a respective counterweight associated therewith for balancing the same.

9. Moment balancing measuring apparatus of the pneumatic type comprising:
a first pivotally mounted lever;
a pneumatic system including a bellows tube operatively associated with one end region of said first lever, first duct means adapted to be connected to a source of pressurized gas, a fixed nozzle in gluid communication with one end of said first duct means, second duct means fluidly intercommunicating said first duct means and said bellows tube, and third duct means in fluid communication with said second duct means;
a second pivotally mounted lever having a flap member mounted thereon, said second lever being positioned such that said flap member is contiguous with said fixed nozzle, whereby upon a measuring force being applied to said second lever and said first duct means being connected to a source of pressurized gas, the position of said levers determines the position of said flap member relative to said fixed nozzle thereby resulting in a certain pressure building up in said nozzle member which is transmitted to said first lever through said second duct means and bellows tube as a pneumatic force; and
means for adjustably varying the ratio of the pneumatic force to the measuring force including a rod-like member having one end rotatably attached to said first lever and locking means for selectively securing said rod-like member to said second lever of the linkage in a particular position with respect to said second lever corresponding to a particular instance of measurement.

* * * * *